US012580807B2

(12) United States Patent
Su et al.

(10) Patent No.: US 12,580,807 B2
(45) Date of Patent: Mar. 17, 2026

(54) SYSTEMS AND METHODS FOR MANAGING A WIRELESS NETWORK BASED ON USER EQUIPMENT DATA

(71) Applicant: Verizon Patent and Licensing Inc., Basking Ridge, NJ (US)

(72) Inventors: Le Su, Edison, NJ (US); Yiming Chen, Harrison, NJ (US); Wenyuan Lu, Raritan, NJ (US); Yu Wan, Edgewater, NJ (US); Michael P. Ruffini, Methuen, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 222 days.

(21) Appl. No.: 18/535,000

(22) Filed: Dec. 11, 2023

(65) Prior Publication Data

US 2025/0193066 A1    Jun. 12, 2025

(51) Int. Cl.
*H04L 41/0631* (2022.01)
*H04L 43/062* (2022.01)
*H04L 43/0823* (2022.01)

(52) U.S. Cl.
CPC ........ *H04L 41/0631* (2013.01); *H04L 43/062* (2013.01); *H04L 43/0823* (2013.01)

(58) Field of Classification Search
CPC ............... H04L 41/0631; H04L 43/062; H04L 43/0823
USPC ......................................................... 709/224
See application file for complete search history.

(56) References Cited

U.S. PATENT DOCUMENTS

2025/0220410 A1 * 7/2025 Matolia ................. H04W 8/183

* cited by examiner

*Primary Examiner* — Lan Dai T Truong

(57) ABSTRACT

In some implementations, a device may identify a network node that supports a first radio access technology (RAT), wherein the network node is associated with sessions with user equipments (UEs). The device may calculate a percentage of traffic from the sessions that is associated with the first RAT and not a second RAT. The device may determine that the network node is associated with a score based on the percentage of traffic associated with the first RAT not satisfying a threshold. The device may collect, based on the network node being associated with the score, device data associated with the UEs. The device may determine a network issue associated with the network node based on the device data. The device may determine a root cause for the network issue. The server may transmit an indication of the root cause.

20 Claims, 7 Drawing Sheets

100

Check for issues using device data and/or network data

Collect device data

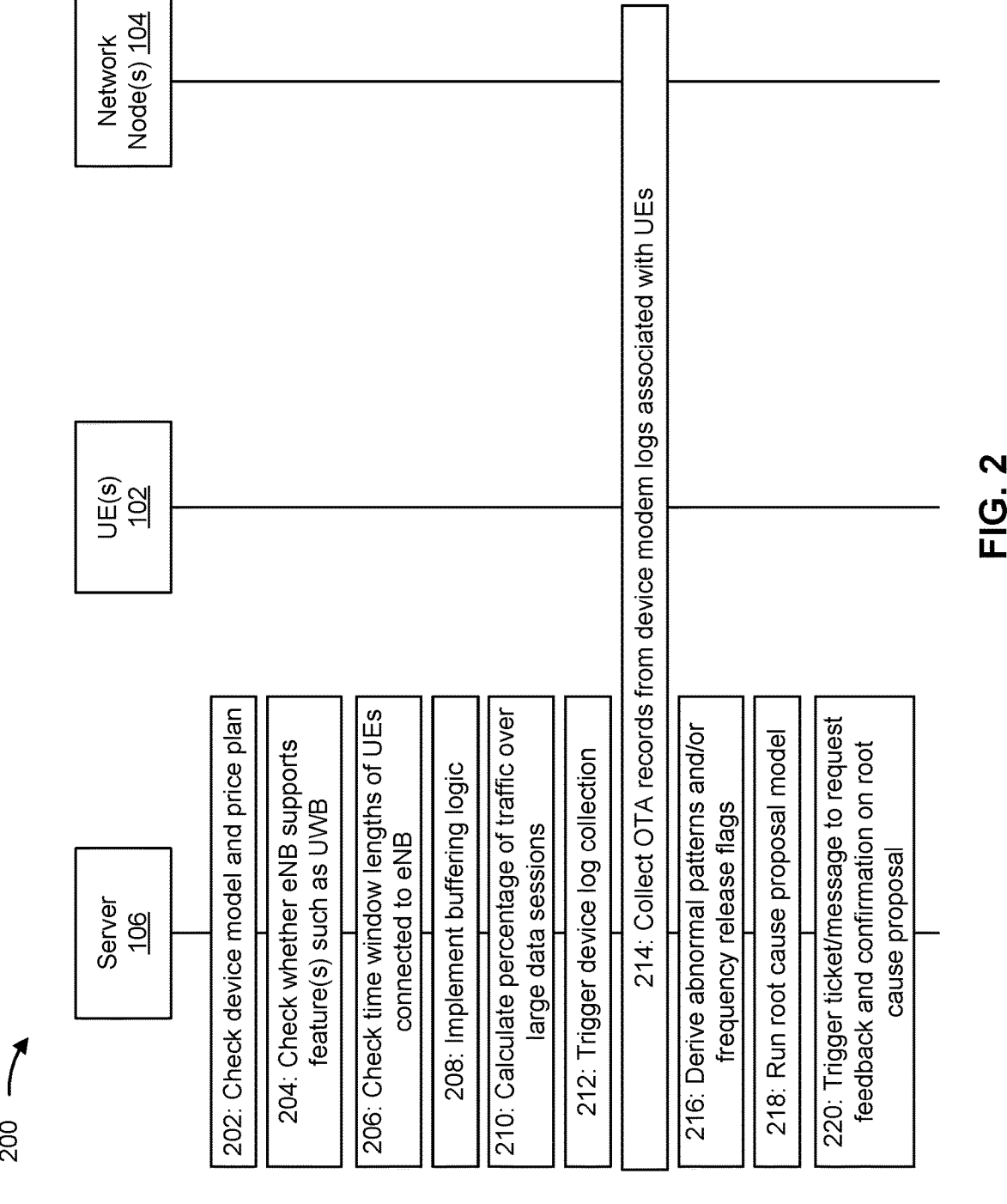

200

Network Node(s) 104

UE(s) 102

Server 106

202: Check device model and price plan

204: Check whether eNB supports feature(s) such as UWB

206: Check time window lengths of UEs connected to eNB

208: Implement buffering logic

210: Calculate percentage of traffic over large data sessions

212: Trigger device log collection

214: Collect OTA records from device modem logs associated with UEs

216: Derive abnormal patterns and/or frequency release flags

218: Run root cause proposal model

220: Trigger ticket/message to request feedback and confirmation on root cause proposal

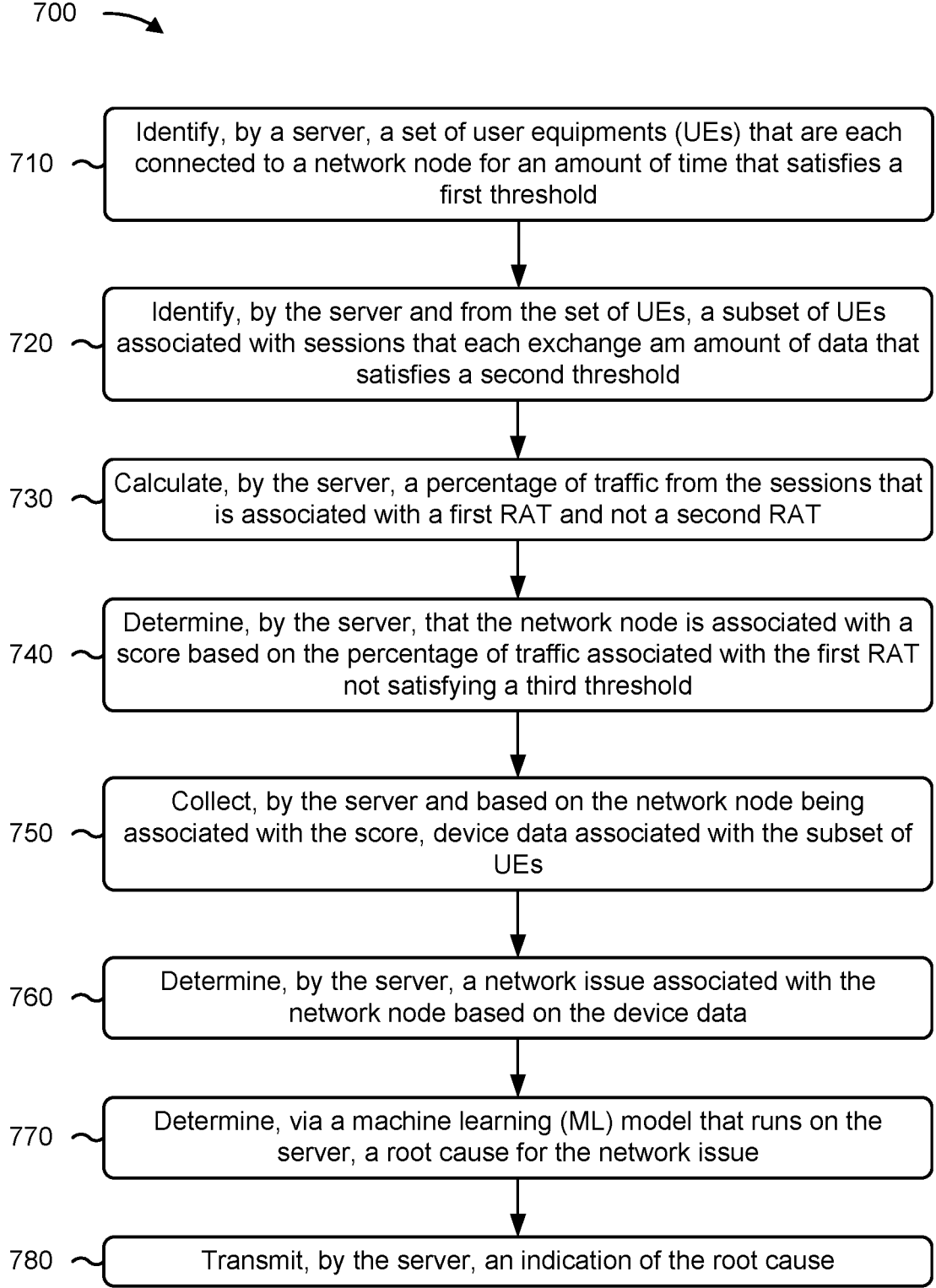

700

710 — Identify, by a server, a set of user equipments (UEs) that are each connected to a network node for an amount of time that satisfies a first threshold 720 — Identify, by the server and from the set of UEs, a subset of UEs associated with sessions that each exchange am amount of data that satisfies a second threshold 730 — Calculate, by the server, a percentage of traffic from the sessions that is associated with a first RAT and not a second RAT 740 — Determine, by the server, that the network node is associated with a score based on the percentage of traffic associated with the first RAT not satisfying a third threshold 750 — Collect, by the server and based on the network node being associated with the score, device data associated with the subset of UEs 760 — Determine, by the server, a network issue associated with the network node based on the device data 770 — Determine, via a machine learning (ML) model that runs on the server, a root cause for the network issue 780 — Transmit, by the server, an indication of the root cause

FIG. 7

SYSTEMS AND METHODS FOR MANAGING A WIRELESS NETWORK BASED ON USER EQUIPMENT DATA

BACKGROUND

Wireless communication systems are widely deployed to provide various telecommunication services such as telephony, video, data, messaging, and broadcasts. A wireless network may include one or more network nodes that support communication for wireless communication devices, such as a user equipment (UE). A UE may communicate with a network node via downlink communications and uplink communications.

BRIEF DESCRIPTION OF THE DRAWINGS

FIG. 2 is a diagram of an example associated with identifying root causes for issues in a wireless network using data collected from UEs.

FIG. 7 is a flowchart of an example process associated with identifying root causes for issues in a wireless network using data collected from UEs.

DETAILED DESCRIPTION OF EXAMPLE EMBODIMENTS

Figure 1:
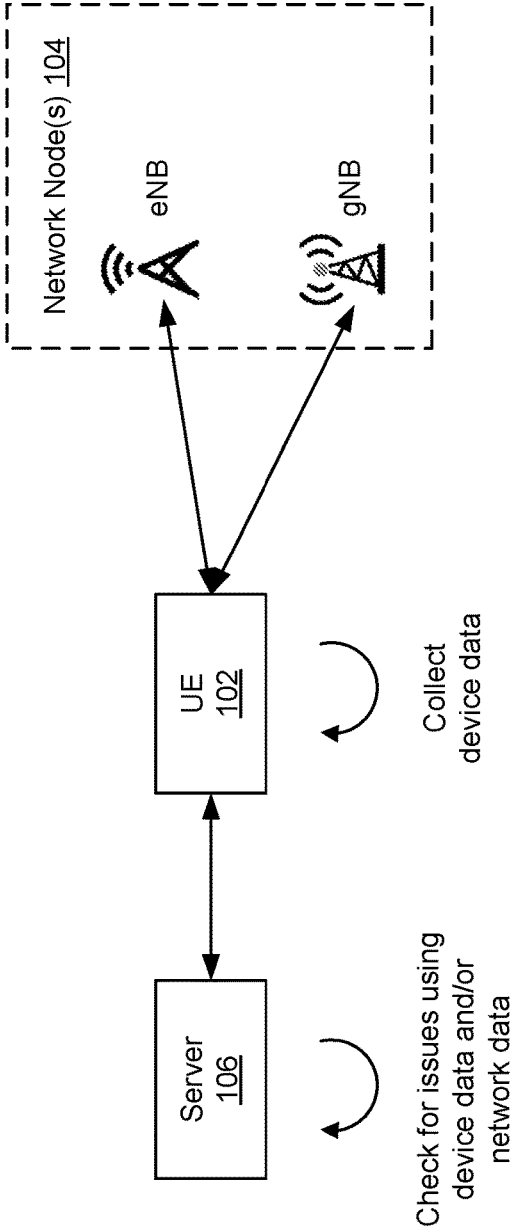
FIG. 1 is a diagram of an example associated with checking for issues using device data and/or network data.

The following detailed description of example implementations refers to the accompanying drawings. The same reference numbers in different drawings may identify the same or similar elements.

A UE may have trouble connecting to a wireless network and/or may have a throughput that is less than an expected value. A UE that is connected to a Fifth Generation (5G) network may be expected to receive a certain throughput. In some cases, the UE may indicate an icon on a display that indicates 5G is available. However, sometimes a data rate of the UE may not correspond to a typical data rate when 5G is available, which may degrade a user experience. In other words, the UE should be able to transmit/receive data at a relatively fast rate, from a wireless network perspective, but the UE is actually unable to do so. The wireless network may collect information on failure events and cause codes, but such information may not always correlate with the user experience. In some cases, no failure events or cause codes may be registered by the wireless network, even though the UE may be experiencing degraded service.

In some implementations, a server may collect information on a network node. The server may determine, using the information, when UEs connected to the network node are experiencing degraded service. For example, when the UEs are capable of 5G, but only transmit/receive data using 5G a relatively small amount of time, the server may flag the network node as having a low score. The low score may indicate that a certain number of UEs connected to that network node do not experience 5G a majority of the time, which may affect a quality of service for those UEs. The UEs may instead transmit/receive data using a combination of 5G and 4G, but an amount of time in which 4G used may be an unacceptable amount. In this case, the server may trigger data collection from the UEs connected to the network node. The data collection may include information on signals transmitted by the UEs. The information may indicate whether or not certain signals are successfully transmitted by the UEs, where such signals may be associated with first radio resource control (RRC) reconfiguration messages, measurement reports, second RRC reconfiguration messages, second RRC reconfiguration complete messages, and/or connection-established messages. The server, using the information, may identify a network issue associated with the UEs, where the network issue may include an abnormal pattern of signaling (e.g., certain signals are almost never successfully transmitted) or frequent connection releases associated with the UEs (e.g., connections are established but almost immediately released for no apparent reason). The server may determine, using a machine learning (ML) model, a root cause for the network issue. The ML model may be trained using historical root causes for network problems. The historical root causes may be characterized by certain features. By identifying features associated with the network issue, and providing those features to the ML model, the ML model may identify the root cause for the network issue. The server may provide an indication of the root cause to a network entity, which may perform a verification of the root cause analysis and/or take appropriate action to remediate the network issue.

In some implementations, by identifying UEs that are associated with poor performance and then triggering data collection from those UEs, the server may identify network issues using data locally collected by the UEs. Such locally collected UE data may not necessarily be known by the network node. The server may be able to use UE data, as well as network data, to identify network issues and then identify potential causes of the network issues. By identifying the potential causes associated with the network issues, remediation of the network issues may be more likely, which may result in an increased likelihood of UEs remaining connected to the network node and/or experiencing higher throughputs, thereby improving an overall system performance. Otherwise, the network node may be unable to identify network issues using network data alone, and such network issues may not even be identified.

FIG. 1 is a diagram of an example 100 associated with checking for issues using device data and/or network data. As shown in FIG. 1, example 100 includes a UE 102, a plurality of network nodes 104, such as an evolved nodeB (eNB) and a next generation nodeB (gNB), and a server 106.

In some implementations, an application may run on the UE 102 to collect device data associated with the UE 102. The device data may indicate diagnostic information associated with the UE 102. The application may not require authentication for a user associated with the UE 102. The application may support modem logging. The device data may include 5G New Radio (NR) measurements, Long Term Evolution (LTE) measurements, failure events, signaling, and/or key performance indicators (KPIs). The application may not, for privacy and other reasons, collect user/device information, location information, and/or information on Internet Protocol (IP) packets. Logs may be uploaded periodically to the server 106. The application may be distributed to a plurality of UEs.

In some implementations, the server 106 may use the device data for improved analytics. The device data may complement network data (e.g., data collected by the plurality of network nodes 104) because network data alone may not always indicate problems associated with UEs. The server 106 may use the device data to resolve network data missing issues. For example, device data may indicate that the UE 102 is connected to the eNB but is not connected to the gNB. The network data, which may indicate NR failure events and cause codes, may not necessarily be correlated with a customer experience, which may be better captured using the device data. The device data may indicate whether 5G service is available to the UE 102 (e.g., an on screen icon, etc.), even when the UE 102 is unable to process 5G traffic. The server 106 may use the device data to check a status of 5G addition procedures (e.g., using KPIs from device logs). In some cases, the device data and the network data may be used to train an artificial intelligence or machine learning (AI/ML) model.

In some implementations, the server 106 may use the device data to check whether UE supported bands match with eNB supported bands (e.g., indicated by the network data). The server 106 may use the device data to check whether the UE 102 received an RRC connection reconfiguration message from the eNB. The server 106 may use the device data to check whether the UE 102 transmitted, in response to the RRC connection reconfiguration message, an RRC connection reconfiguration complete message to the eNB. The server 106 may use the device data to check whether the UE 102 has favorable network coverage. For example, the device data may include reference signal receive power (RSRP) measurements, reference signal received quality (RSRQ) measurements, signal-to-interference-plus-noise ratio (SINR) measurements, a measurement gap status, and/or a 5G NR cell identifier. The UE 102 may not transmit a measurement report to the eNB when a signal measurement exceeds a threshold (e.g., the signal measurement does not trigger a measurement reporting event).

The server 106 may use the device data and/or the network data to check whether the eNB transmits a secondary gNB (SgNB) addition request message via an X2 interface to the gNB. The server 106 may use the device data and/or the network data to check whether the gNB transmits an SgNB addition request acknowledge (or reject) message to the eNB. The server 106 may use the device data and/or the network data to check whether the eNB transmits an SgNB reconfiguration complete message to the gNB. The server 106 may use the device data to check whether the UE 102 successfully detected the gNB and set up a random access channel (RACH) procedure. For example, the server 106 may use the device data to check whether the UE 102 detects a synchronization signal (SS) block of the gNB and/or whether the UE 102 performs an initial RACH procedure with the gNB.

In some implementations, when the UE 102 has 5G usage or should have 5G usage, the server 106 may perform troubleshooting of various problems via the device data. A first problem may involve the eNB not transmitting the RRC reconfiguration message, which may be detected using sample logs and derived KPIs. A second problem may involve an RF condition not matching in a measurement report, which may be detected using the sample logs and the derived KPIs. A third problem may involve the measurement report being transmitted but no second RRC reconfiguration message being transmitted, which may be detected using the sample logs and the derived KPIs. A fourth problem may involve NR setup/RACH failures, which may be detected using the sample logs and the derived KPIs.

In some implementations, a 5G addition session setup analysis may indicate abnormal patterns in specific eNBs, where each eNB may be associated with a number of UEs. For a given eNB, a first percentage of sessions may end prior to a first RRC reconfiguration, a second percentage of sessions may end prior to a measurement report, a third percentage of sessions may end prior to a second RRC reconfiguration, and a fourth percentage of sessions may end prior to a second RRC completed, where only a fifth percentage of sessions may be associated with a connection being established. As an example, most frequently observed abnormal patterns may be those associated with the first RRC reconfiguration and second RRC completed messages. The 5G addition session setup analysis may be used as a pattern for anomaly detection.

In some implementations, a frequency release analysis by time may indicate a percentage of sustained versus frequent release connections. A percentage of sessions may be associated with frequent release, whereas another percentage of sessions may be associated with a sustained connection. In other words, another mechanism to detect anomalies may be from the time scale. A frequency release problem may be defined in terms of sessions setup successfully but released in less than one second. The frequency release analysis may be used as a pattern for anomaly detection.

In some implementations, regarding 5G accessibility, the server 106 may determine a low 5G UE percentage score per eNB using the network data. Historically, in an area of low 5G UE percentage scores per eNB in a given coverage area, a number of eNBs with a low 5G UE percentage score in range of 0-20% may be higher than the other ranges, but at least a few eNBs may be in bins of an 80-100% range, which may be calculated from the network data in order to cross-validate with anomaly eNBs found by the frequent release (within one second) mechanism. Further, 5G capable UEs connected with a 5G capable eNB (anchor cell) may use a relatively large data volume, but a relatively small percentage of the sessions may be on 5G.

In some implementations, the UE 102 may collect device data for issue cells, where the device data may indicate low throughput and/or frequent handover associated with the issue cells. The server 106 may infer low throughput and/or the frequent handover using the device data (e.g., concession logs analytics of measurement reports).

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

FIG. 2 is a diagram of an example 200 associated with identifying root causes for issues in a wireless network using data collected from UEs. As shown in FIG. 2, example 200 includes a UE 102, a plurality of network nodes 104, such as an evolved nodeB (eNB) and a next generation nodeB (gNB), and a server 106.

As shown by reference number 202, in a 5G addition alarming calculation, for each UE 102, the server 106 may check a device model and a price plan to determine whether the UE 102 supports specific features, (e.g., ultra-wideband (UWB), Low Latency, etc.) or not (e.g., whether the UE 102 is 5G capable). As shown by reference number 204, when a specific feature (e.g., UWB) is supported, for each session, the server 106 may check whether an eNB (e.g., a connected eNB cell) supports UWB (or other features) anchoring based on historical network data records, which may be a data driven technique to avoid discrepancy between network design and implementation. For example, the server 106 may check a configuration of the eNB to determine whether UWB anchoring is supported. The example of UWB may be just one type of feature that may be supported. As shown by reference number 206, when the eNB supports UWB (or other features) anchoring, in a target hour, the server 106 may check time window lengths of UEs connected to the eNB, as well as distances between eNBs, to generate a score for mobility. The UEs with relatively high mobility may be filtered to avoid statistics being skewed by high mobility activities, such as handover. The UEs with relatively low mobility may be kept.

As shown by reference number 208, for each data session, the server 106 may implement a 5G buffering logic for eNBs. The eNBs may be volume-based buffering logic eNBs or packet-counts-based buffering logic eNBs. For some eNBs, although no buffer-based logic may be present, the volume-based buffering logic may be applied to focus on customer perceivable activities. Fixed wireless access (FWA) devices, for example, may have no buffer-based logic, whereas UEs (having mobility) may have buffer-based logic. The UEs with relatively small data volume or relatively few packets may be filtered. As shown by reference number 210, the server 106 may calculate the percentage of traffic (e.g., UWB traffic) over all large data sessions (e.g., sessions that satisfy a threshold amount of data). The server 106 may set a percentage (e.g., a UWB percentage) as an accessibility score for the UE 102 on that target hour. The server 106 may apply daily aggregation on the hourly scores for all of the UEs on a specific eNB with a UE score less than a defined value (e.g., UE score <0.05) (defined as low 5G UE). For example, when the UE 102 only receives UWB traffic a percentage of a time that is below a percentage threshold, the UE 102 may be classified as a low 5G UE. The server 106 may calculate a low 5G UE percentage on an eNB level. In other words, the server 106 may calculate the low 5G UE percentage associated with that specific eNB.

As shown by reference number 212, the server 106 may trigger a device log collection for issue eNBs with the relatively high low 5G UE percentage. As shown by reference number 214, the server 106 may collect over-the-air (OTA) records from device modem logs associated with the UEs. The server 106 may extract corresponding signals of a 5G addition procedure, which may include a first RRC reconfiguration request with a measurement identifier and a band requirement, a measurement report from the UE 102 associated with the measurement identifier, a second RRC reconfiguration request with a physical cell identifier (PCI) and absolute radio-frequency channel number (ARFCN), a successful RACH attach message, and/or an evolved universal mobile telecommunications system terrestrial radio access network (E-UTRAN) NR dual connectivity (ENDC) connection release.

As shown by reference number 216, the server 106 may derive abnormal patterns (e.g., percentage distributions of different signals are different) and/or frequency release flags (e.g., connections are released less than one second) based on the signals associated with the 5G addition procedures. As shown by reference number 218, from the generated patterns and other metrics, the server 106 may run a root cause proposal model based on an issue cell site clustering algorithm. The server 106 may run an ML assisted root cause prediction. For example, the server 106 may determine potential root causes from historical troubleshooting (e.g., known root causes) in the same cluster based on feature embedding. Features of the abnormal patterns may be compared to features of known root causes, and based on similarities between features, the potential root cause may be derived. The potential root cause may be confirmed via a user interface, and such information may be fed back into a model for the ML assisted root cause prediction. As shown by reference number 220, the server 106 may automatically trigger a ticket/message to a network repair bureau (NRB), network assurance, and system performance entity to request feedback and confirmation on the root cause proposal. The trigger may also be used to alert the wireless network to take some form of autonomous corrective action, where the type of autonomous corrective action may depend on the root cause proposal. For example, certain root causes may be associated with predefined corrective actions. The server 106 may update a historical issue records pool by an end of a troubleshooting procedure.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
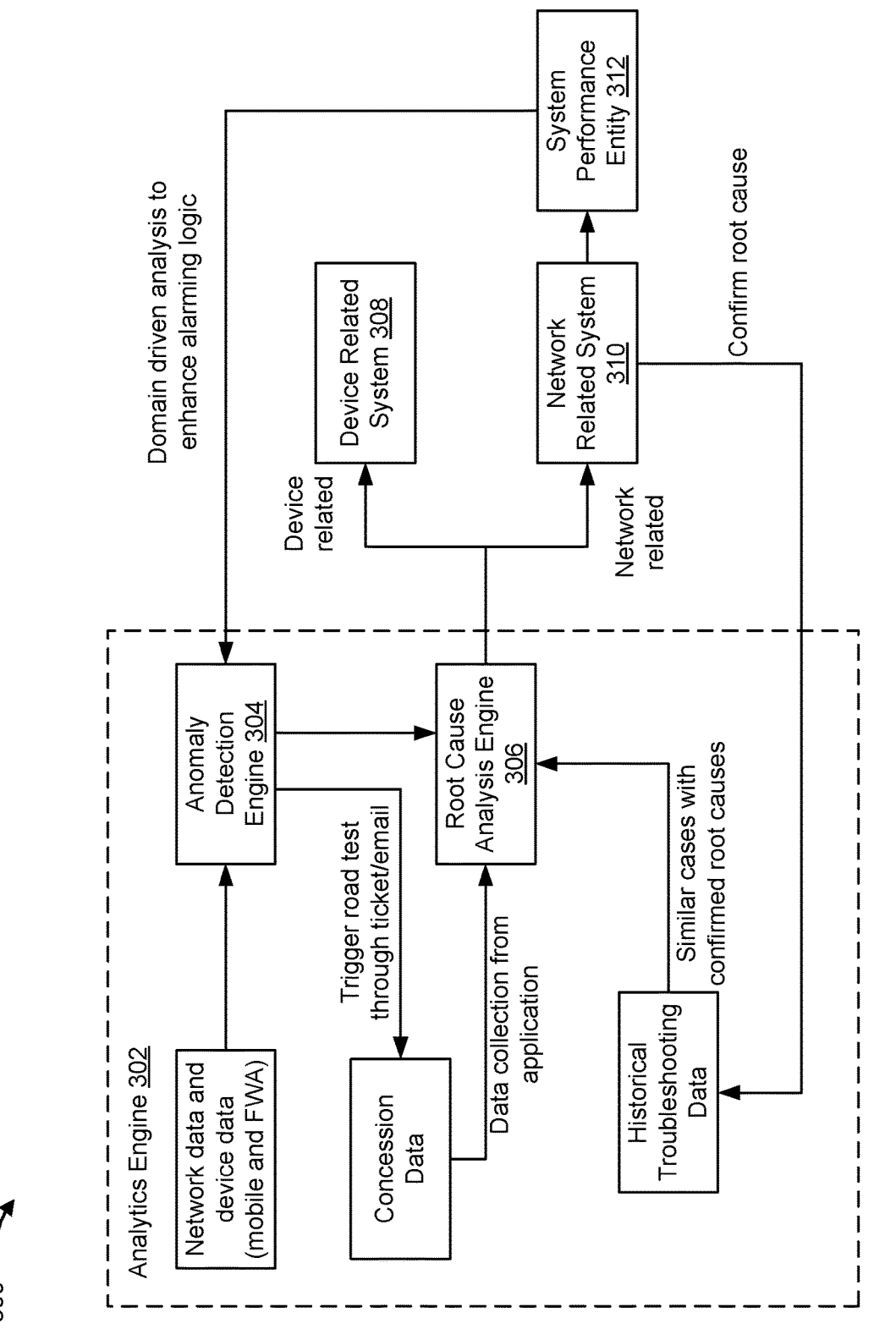
FIG. 3 is a diagram of an example associated with anomaly detection and root cause analysis.

FIG. 3 is a diagram of an example 300 associated with anomaly detection and root cause analysis.

As shown in FIG. 3, example 300 includes an analytics engine 302. The analytics engine 302 may be associated with a server (e.g., server 106). The analytics engine 302 may include an anomaly detection engine 304. The anomaly detection engine 304 may identify network data and device data (e.g., mobile data and FWA data). The anomaly detection engine 304 may detect anomalies associated with the network data and/or the device data. The analytics engine 302 may also include a root cause analysis engine 306. The root cause analysis engine 306 may use information on detected anomalies, concession data collected from applications running on UEs (e.g., the concession data may be additional data that is triggered by the anomaly detection engine 304), and/or historical troubleshooting data (e.g., similar cases with confirmed root causes) to identify or estimate a root cause of the detected anomalies. Information regarding the root cause may be provided to a device-related system 308 when the root cause is device-related. Information regarding the root cause may be provided to a network-related system 310 (e.g., an NRB or network assurance entity) and/or to a system performance entity 312 when the root cause is network-related. The network-related system 310 may be able to confirm the root cause, which may be used to update the historical troubleshooting data. The confirmed root cause may be used for feature embedding, which may be used when calculating a next root cause analysis. An output of the system performance entity may be provided to the anomaly detection engine 304, such that domain-driven analysis may be used to enhance an alarming logic.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
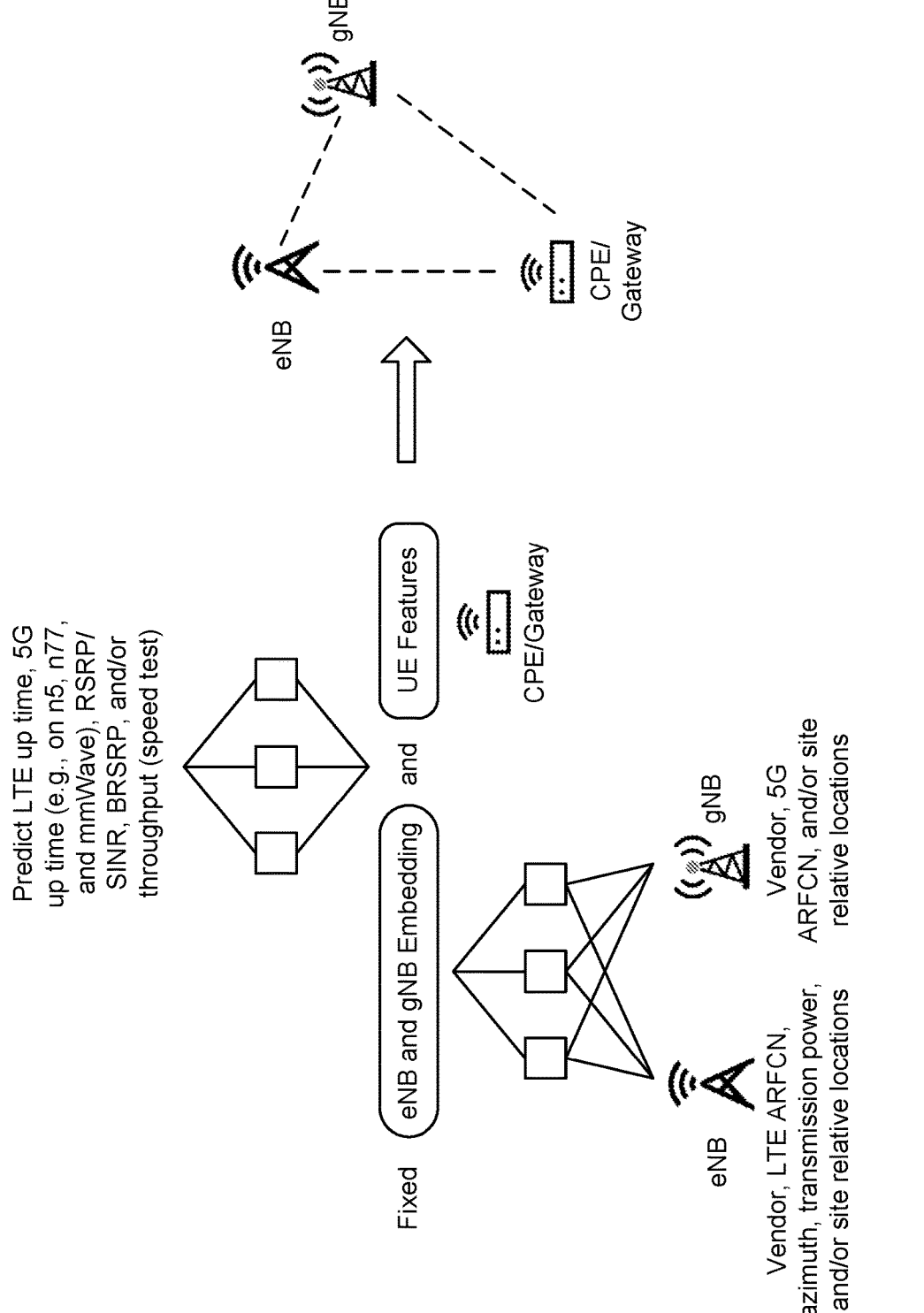
FIG. 4 is a diagram of an example associated with features-embedded learning.

FIG. 4 is a diagram of an example 400 associated with features-embedded learning.

As shown in FIG. 4, in a features-embedded learning model for an eNB and gNB combination in FWA, eNB and gNB embedding may be combined with UE features to derive predictions. The eNB features may include information regarding a vendor, an LTE ARFCN, an azimuth, a transmission power, and/or site relative locations. The gNB features may include information regarding a vendor, a 5G NR ARFCN, and/or site-relative locations. The UE features (e.g., for a customer premises equipment (CPE) or a gateway) may include information regarding an original equipment manufacturer (OEM), model, software version number (SVN), data plan, and/or UE relative location. The predictions, based on the eNB and gNB embedding combined with the UE features, may include an LTE up time, a 5G up time (e.g., on n5, n77, and mmWave bands), RSRP/SINR measurements, beam RSRP measurements, and/or a throughput.

A first use case for features embedding may involve an eNB and gNB clustering for a potential root cause proposal. An issue may be detected for an eNB and gNB pair. Different clusters of eNB and gNB pairs may be formed using an eNB and gNB embedding-based clustering. Information regarding historical issue root causes in a cluster (e.g., wrong anchoring, coverage, outage, or qualification) may be maintained as part of the features-embedded learning. By comparing features associated with the historical issue root causes in the cluster and features associated with the newly detected issue for the eNB and gNB pair, a potential root cause may be identified.

A second use case for features embedding may involve an enhanced FWA qualification with performance prediction. The eNB and gNB embedding (e.g., fixed features) may be combined with the UE features to obtain a predicted performance in throughput and/or RSRP. The UE features may include information regarding an OEM, a model, an SVN, a data plan, and/or a serving address. The predicted performance may be compared to a service level agreement (SLA) to check whether the predicted performance satisfies the SLA.

A third use case for features embedding may involve network planning. The eNB and gNB embedding may be combined with the UE features (e.g., fixed UE features) to obtain a predicted performance in throughput and/or RSRP. In this case, features associated with the eNB and gNB embedding may be adjustable to determine which features produce the highest throughput and/or RSRP. Features such as vendor, ARFCN, azimuth, transmission power, and/or site-relative locations may be adjusted to produce the highest throughput and/or RSRP.

As indicated above, FIG. 4 is provided as an example. Other examples may differ from what is described with regard to FIG. 4.

Figure 5:
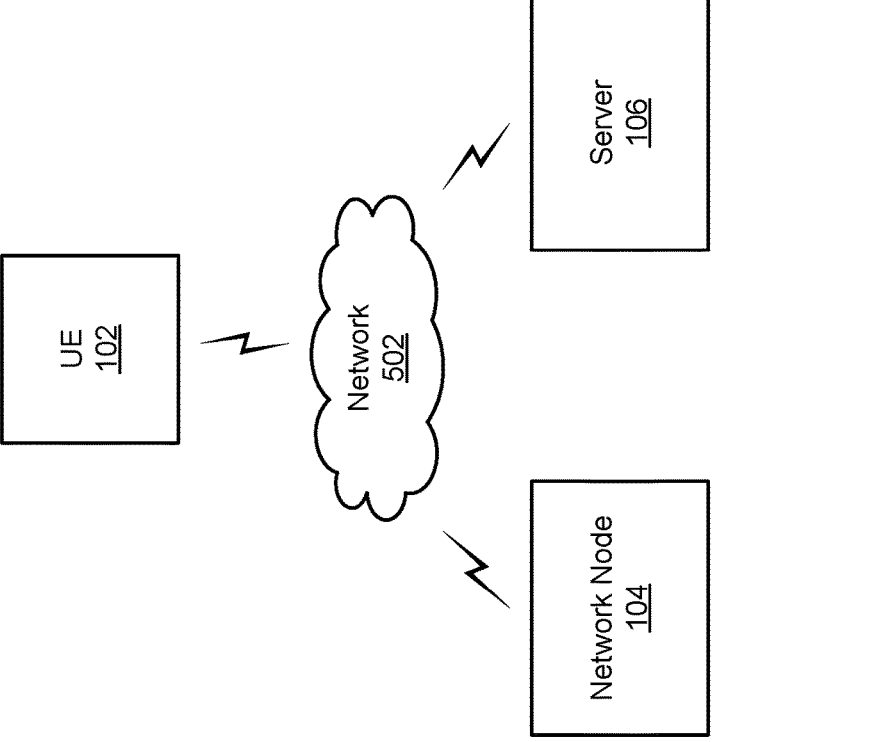
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a UE 102, a network node 104, a server 106, and a network 502. Devices of environment 500 may interconnect via wired connections, wireless connections, or a combination of wired and wireless connections.

The UE 102 may include one or more devices capable of receiving, generating, storing, processing, and/or providing information associated with identifying root causes for issues in a wireless network using data collected from UEs, as described elsewhere herein. The UE 102 may include a communication device and/or a computing device. For example, the UE 102 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network node 104 may include one or more devices capable of receiving, processing, storing, routing, and/or providing information associated with identifying root causes for issues in a wireless network using data collected from UEs, as described elsewhere herein. The network node 104 may be an aggregated network node, meaning that the aggregated network node is configured to utilize a radio protocol stack that is physically or logically integrated within a single radio access network (RAN) node (e.g., within a single device or unit). The network node 104 may be a disaggregated network node (sometimes referred to as a disaggregated base station), meaning that the network node 104 is configured to utilize a protocol stack that is physically or logically distributed among two or more nodes (such as one or more central units (CUs), one or more distributed units (DUs), or one or more radio units (RUs)). The network node 104 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, and/or a RAN node.

The server 106 may include one or more devices capable of receiving, generating, storing, processing, providing, and/or routing information associated with identifying root causes for issues in a wireless network using data collected from UEs, as described elsewhere herein. The server 106 may include a communication device and/or a computing device. For example, the server 106 may include a server, such as an application server, a client server, a web server, a database server, a host server, a proxy server, a virtual server (e.g., executing on computing hardware), or a server in a cloud computing system. In some implementations, the server 106 may include computing hardware used in a cloud computing environment.

The network 502 may include one or more wired and/or wireless networks. For example, the network 502 may include a cellular network (e.g., a 5G network, a 4G network, an LTE network, a Third Generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 502 may enable communication among the one or more devices of environment 500.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
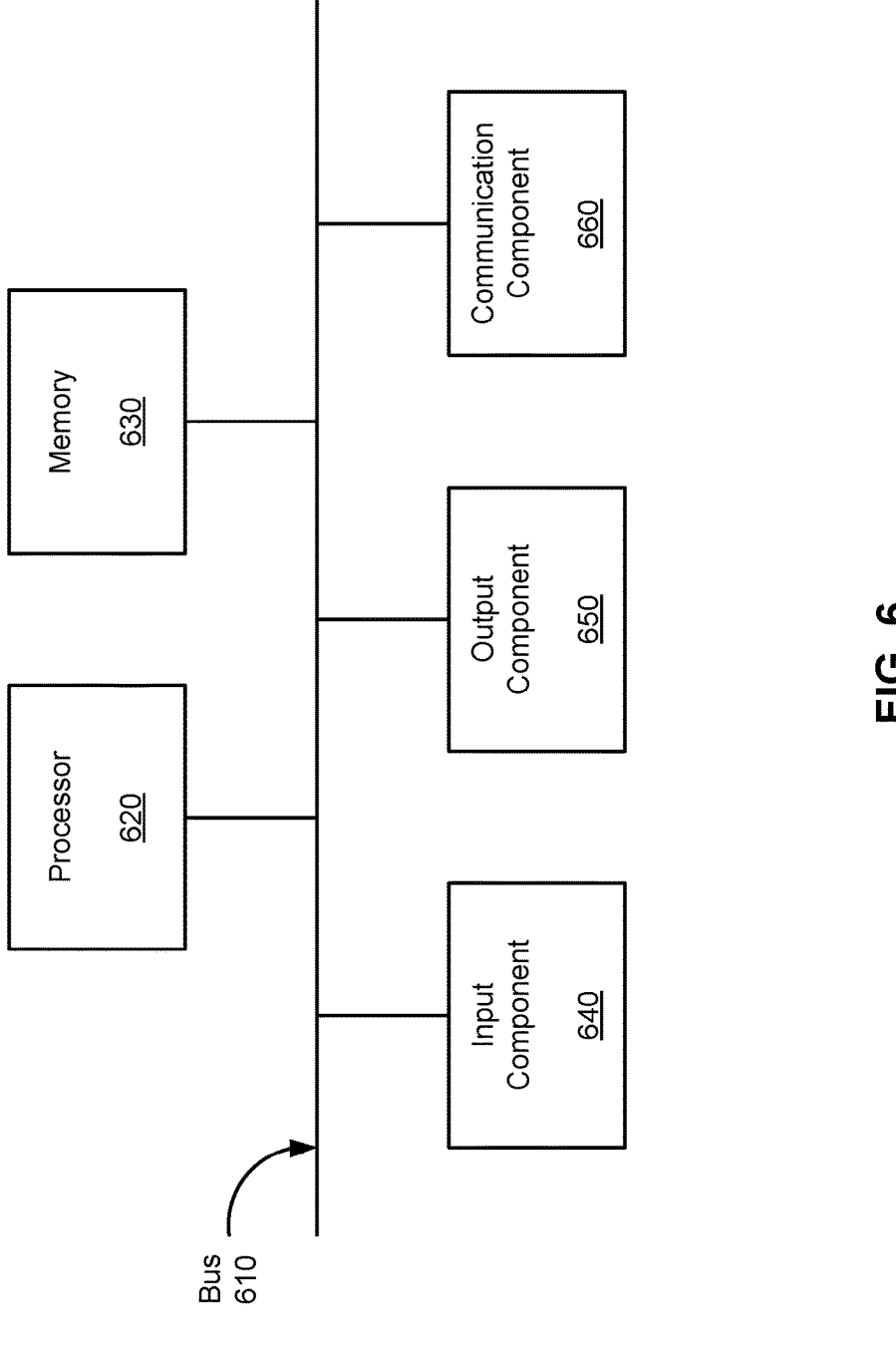
FIG. 6 is a diagram of example components of one or more devices of FIG. 5.

FIG. 6 is a diagram of example components of a device 600 associated with identifying root causes for issues in a wireless network using data collected from UEs. The device 600 may correspond to a UE (e.g., UE 102), a network node (e.g., network node 104), and/or a server (e.g., server 106). In some implementations, the UE, the network node, and/or the server may include one or more devices 600 and/or one or more components of the device 600. As shown in FIG. 6, the device 600 may include a bus 610, a processor 620, a memory 630, an input component 640, an output component 650, and/or a communication component 660.

The bus 610 may include one or more components that enable wired and/or wireless communication among the components of the device 600. The bus 610 may couple together two or more components of FIG. 6, such as via operative coupling, communicative coupling, electronic coupling, and/or electric coupling. For example, the bus 610 may include an electrical connection (e.g., a wire, a trace, and/or a lead) and/or a wireless bus. The processor 620 may include a central processing unit, a graphics processing unit, a microprocessor, a controller, a microcontroller, a digital signal processor, a field-programmable gate array, an application-specific integrated circuit, and/or another type of processing component. The processor 620 may be implemented in hardware, firmware, or a combination of hardware and software. In some implementations, the processor 620 may include one or more processors capable of being programmed to perform one or more operations or processes described elsewhere herein.

The memory 630 may include volatile and/or nonvolatile memory. For example, the memory 630 may include random access memory (RAM), read only memory (ROM), a hard disk drive, and/or another type of memory (e.g., a flash memory, a magnetic memory, and/or an optical memory). The memory 630 may include internal memory (e.g., RAM, ROM, or a hard disk drive) and/or removable memory (e.g., removable via a universal serial bus connection). The memory 630 may be a non-transitory computer-readable medium. The memory 630 may store information, one or more instructions, and/or software (e.g., one or more software applications) related to the operation of the device 600. In some implementations, the memory 630 may include one or more memories that are coupled (e.g., communicatively coupled) to one or more processors (e.g., processor 620), such as via the bus 610. Communicative coupling between a processor 620 and a memory 630 may enable the processor 620 to read and/or process information stored in the memory 630 and/or to store information in the memory 630.

The input component 640 may enable the device 600 to receive input, such as user input and/or sensed input. For example, the input component 640 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 650 may enable the device 600 to provide output, such as via a display, a speaker, and/or a light-emitting diode. The communication component 660 may enable the device 600 to communicate with other devices via a wired connection and/or a wireless connection. For example, the communication component 660 may include a receiver, a transmitter, a transceiver, a modem, a network interface card, and/or an antenna.

The device 600 may perform one or more operations or processes described herein. For example, a non-transitory computer-readable medium (e.g., memory 630) may store a set of instructions (e.g., one or more instructions or code) for execution by the processor 620. The processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hard-wired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

The number and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

FIG. 7 is a flowchart of an example process 700 associated with identifying root causes for issues in a wireless network using data collected from UEs. In some implementations, one or more process blocks of FIG. 7 may be performed by a server (e.g., server 106). Additionally, or alternatively, one or more process blocks of FIG. 7 may be performed by one or more components of device 600, such as processor 620, memory 630, input component 640, output component 650, and/or communication component 660.

As shown in FIG. 7, process 700 may include identifying, by the server, a set of UEs that are each connected to a network node for an amount of time that satisfies a first threshold (block 710). The first threshold may be associated with a time threshold value. The set of UEs may include UEs that are associated with relatively low mobility. The set of UEs may not include UEs that are associated with relatively high mobility. In some implementations, the network node may support a first RAT. The first RAT may be an NR RAT (e.g., a 5G RAT).

As shown in FIG. 7, process 700 may include identifying, by the server and from the set of UEs, a subset of UEs associated with sessions that each exchange an amount of data that satisfies a second threshold (block 720). The second threshold may be associated with a data threshold value. The subset of UEs may include UEs that exchange relatively large amounts of data. The subset of UEs may not include UEs that exchange relatively small amounts of data.

As shown in FIG. 7, process 700 may include calculating, by the server, a percentage of traffic from the sessions that is associated with the first RAT and not a second RAT (block 730). The second RAT may be different from the first RAT.

The second RAT may be an LTE RAT (e.g., a 4G RAT). A portion of traffic may be associated with the first RAT and a portion of traffic may be associated with the second RAT.

As shown in FIG. 7, process 700 may include determining, by the server, that the network node is associated with a score based on the percentage of traffic associated with the first RAT not satisfying a third threshold (block 740). For example, when the traffic is associated with the first RAT a majority of time, the third threshold may be satisfied. On the other hand, when the traffic is associated with the second RAT a majority of time, the third threshold may not be satisfied. When the server is associated with the score (e.g., a low score), the traffic associated with the server may be associated with the second RAT for an unacceptable portion of time.

As shown in FIG. 7, process 700 may include collecting, by the server and based on the network node being associated with the score, device data associated with the subset of UEs, wherein the device data is associated with signals corresponding to a cell addition procedure (block 750). The signals corresponding to the cell addition procedure may include signals associated with: a first RRC reconfiguration request with a measurement identifier and a band requirement, a measurement report from the UE for a measurement identifier, a second RRC reconfiguration request with a PCI and an ARFCN, a successful RACH attach message, and/or a connection release message.

As shown in FIG. 7, process 700 may include determining, by the server, a network issue associated with the network node based on the device data (block 760). The network issue may be associated with an abnormal pattern resulting from a plurality of sessions associated with the network node ending during the cell addition procedure. The network issue may be associated with a frequent release of connections associated with the subset of UEs, and the frequent release may occur when the connections are released within an amount of time after a time of connection establishment that satisfies a fourth threshold (e.g., one second).

As shown in FIG. 7, process 700 may include determining, via an ML model that may run on the server, a root cause for the network issue (block 770). The server may determine, via the ML model, the root cause for the network issue based on a comparison of features associated with the network issue and features associated with historical network issues. Historical network issues having features that correspond to a current network issue may be used to determine the root cause.

As shown in FIG. 7, process 700 may include transmitting, by the server, an indication of the root cause (block 780). For example, the indication may be transmitted to an external system, which may confirm the root cause. Further, a database of historical root causes may be updated based on the indication. In some implementations, the root cause may trigger an entity in a wireless network to perform an autonomous corrective action to resolve the network issue. A type of autonomous corrective action may be based on the root cause. For example, a specific root cause may be associated with a specific autonomous corrective action.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different)

processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
identifying, by a server, a set of user equipments (UEs) that are each connected to a network node for an amount of time that satisfies a first threshold, wherein the network node supports a first radio access technology (RAT);
identifying, by the server and from the set of UEs, a subset of UEs associated with sessions, wherein the sessions each exchange an amount of data that satisfies a second threshold;
calculating, by the server, a percentage of traffic from the sessions that is associated with the first RAT and not a second RAT;
determining, by the server, that the network node is associated with a score based on the percentage of traffic associated with the first RAT not satisfying a third threshold;
collecting, by the server and based on the network node being associated with the score, device data associated with the subset of UEs, wherein the device data is associated with signals corresponding to a cell addition procedure;
determining, by the server, a network issue associated with the network node based on the device data;
determining, via a machine learning (ML) model that runs on the server, a root cause for the network issue; and
transmitting, by the server, an indication of the root cause.

2. The method of claim 1, wherein the root cause triggers an entity in a wireless network to perform an autonomous corrective action to resolve the network issue, and a type of autonomous corrective action is based on the root cause.

3. The method of claim 1, wherein the first RAT is a New Radio (NR) RAT and the second RAT is a Long Term Evolution (LTE) RAT.

4. The method of claim 1, further comprising:
verifying that a device model associated with a UE, of the subset of UEs, and a price plan associated with the UE support the first RAT.

5. The method of claim 1, wherein the signals corresponding to the cell addition procedure include signals associated with a first radio resource control (RRC) reconfiguration request with a measurement identifier and a band requirement.

6. The method of claim 1, wherein the signals corresponding to the cell addition procedure include signals associated with a measurement report from a UE, of the subset of UEs, for a measurement identifier.

7. The method of claim 1, wherein the signals corresponding to the cell addition procedure include signals associated with a second radio resource control (RRC) reconfiguration request with a physical cell identifier (PCI) and a absolute radio-frequency channel number (ARFCN).

8. The method of claim 1, wherein the signals corresponding to the cell addition procedure include signals associated with a successful random access channel (RACH) attach message.

9. The method of claim 1, wherein the signals corresponding to the cell addition procedure include signals associated with a connection release message.

10. The method of claim 1, wherein the network issue is associated with an abnormal pattern resulting from a plurality of sessions associated with the network node ending during the cell addition procedure.

11. The method of claim 1, wherein the network issue is associated with a frequent release of connections associated with the subset of UEs, and the frequent release occurs when the connections are released within an amount of time after a time of connection establishment that satisfies a fourth threshold.

12. The method of claim 1, wherein determining, via the ML model, the root cause for the network issue is based on a comparison of features associated with the network issue and features associated with historical network issues.

13. A device, comprising:
one or more processors configured to:
identify a network node that supports a first radio access technology (RAT), wherein the network node is associated with sessions with user equipments (UEs);
calculate a percentage of traffic from the sessions that is associated with the first RAT and not a second RAT;
determine that the network node is associated with a score based on the percentage of traffic associated with the first RAT not satisfying a threshold;
collect, based on the network node being associated with the score, device data associated with the UEs, wherein the device data is associated with signals corresponding to a cell addition procedure;
determine a network issue associated with the network node based on the device data;
determine, via a machine learning (ML) model, a root cause for the network issue; and
transmit an indication of the root cause.

14. The device of claim 13, wherein:
the signals corresponding to the cell addition procedure include signals associated with a first radio resource control (RRC) reconfiguration request with a measurement identifier and a band requirement; or the signals corresponding to the cell addition procedure include signals associated with a measurement report for a measurement identifier.

15. The device of claim 13, wherein the signals corresponding to the cell addition procedure include signals associated with a second radio resource control (RRC) reconfiguration request with a physical cell identifier (PCI) and a absolute radio-frequency channel number (ARFCN).

16. The device of claim 13, wherein the signals corresponding to the cell addition procedure include signals associated with a successful random access channel (RACH) attach message.

17. The device of claim 13, wherein the signals corresponding to the cell addition procedure include signals associated with a connection release message.

18. A non-transitory computer-readable medium storing a set of instructions, the set of instructions comprising:

one or more instructions that, when executed by one or more processors of a server, cause the server to:

identify a network node that supports a first radio access technology (RAT), wherein the network node is associated with sessions with user equipments (UEs);

calculate a percentage of traffic from the sessions that is associated with the first RAT and not a second RAT;

determine that the network node is associated with a score based on the percentage of traffic associated with the first RAT not satisfying a threshold;

collect, based on the network node being associated with the score, device data associated with the UEs, wherein the device data is associated with signals corresponding to a cell addition procedure;

determine a network issue associated with the network node based on the device data;

determine, via a machine learning (ML) model, a root cause for the network issue; and transmit an indication of the root cause.

19. The non-transitory computer-readable medium of claim 18, wherein the network issue is associated with a frequent release of connections associated with the UEs, and the frequent release occurs when the connections are released within an amount of time after a time of connection establishment that satisfies a fourth threshold.

20. The non-transitory computer-readable medium of claim 18, wherein the one or more instructions, when executed by the one or more processors, further cause the server to:

determine, via the ML model, the determined root cause for the network issue based on a comparison of features associated with the network issue and features associated with historical network issues.

* * * * *